United States Patent Office 3,240,334
Patented Mar. 15, 1966.

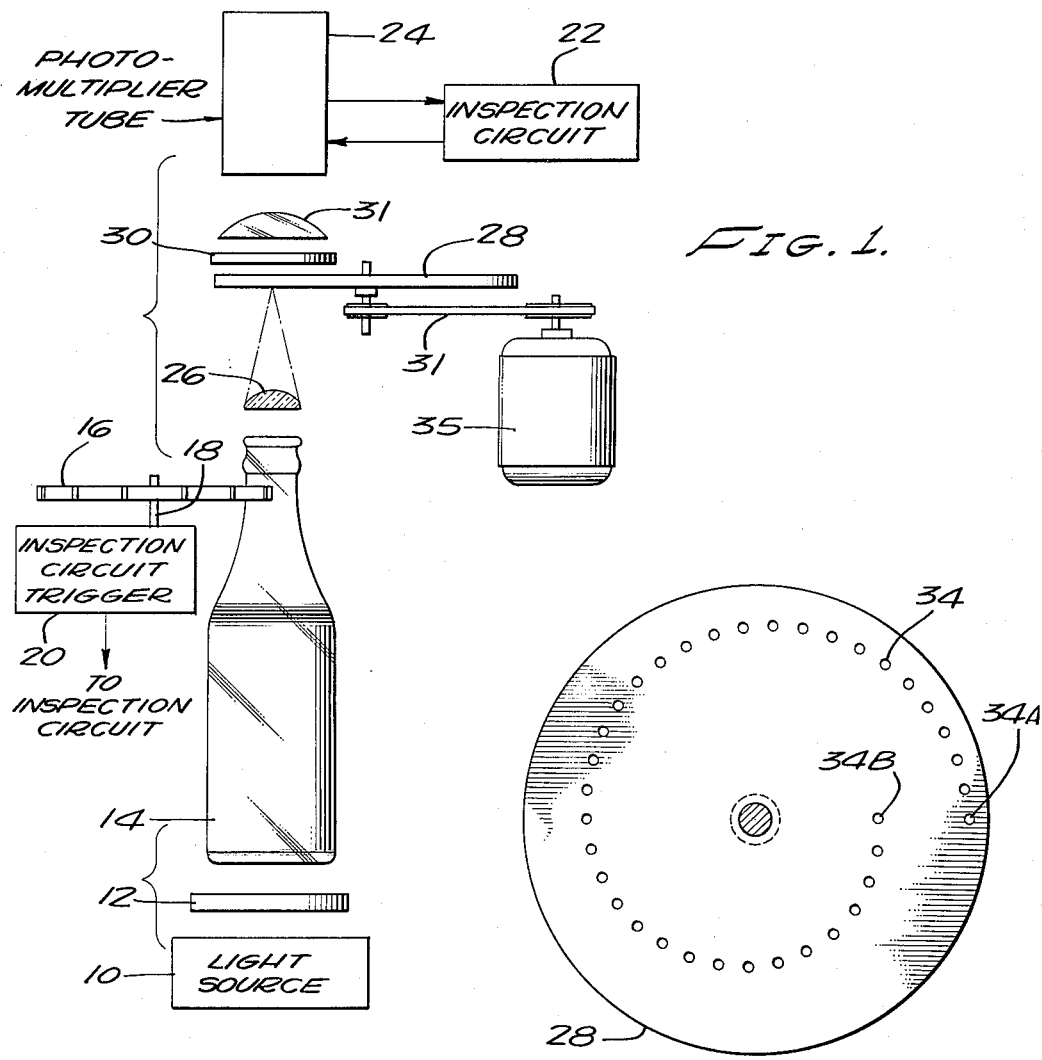

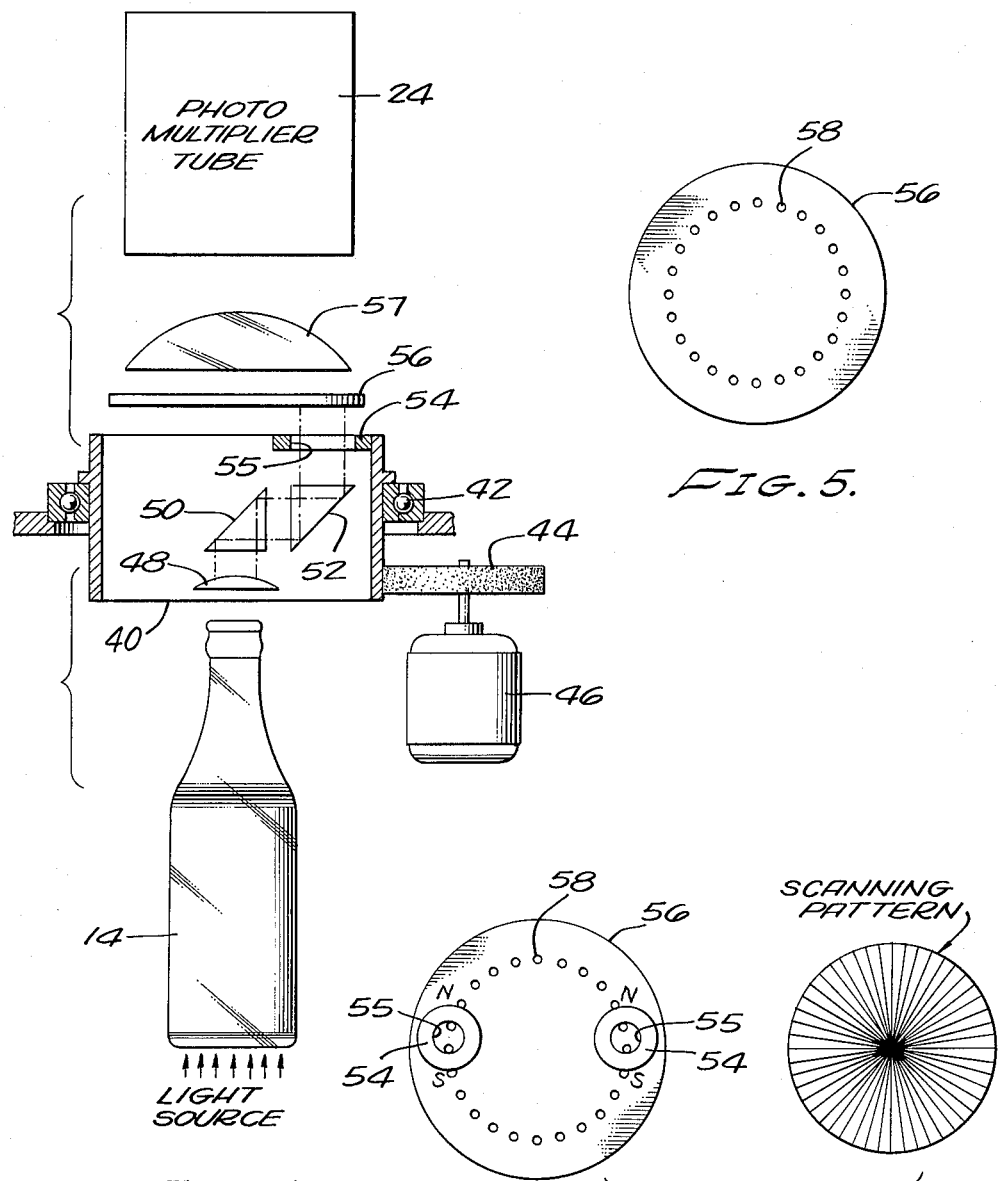

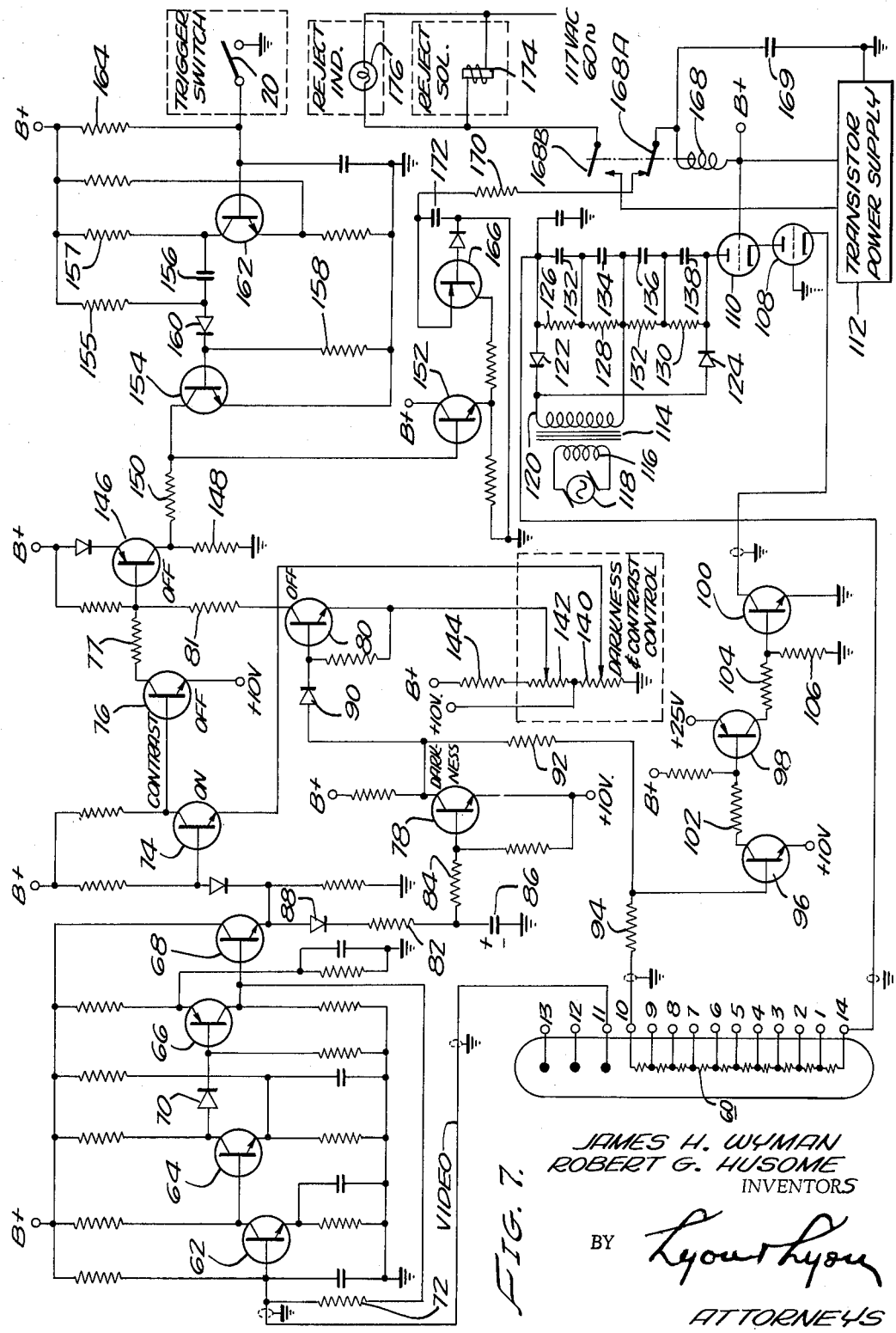

3,240,334
EMPTY-BOTTLE INSPECTION SYSTEM UTILIZING A PHOTOMULTIPLIER TUBE
James H. Wyman, San Pedro, Los Angeles, and Robert G. Husome, Manhattan Beach, Calif., assignors, by mesne assignments, to Barry-Wehmiller Machinery Co.
Filed Mar. 19, 1962, Ser. No. 180,422
18 Claims. (Cl. 209—111.7)

This invention relates to systems for inspecting empty bottles for cleanliness and, more particularly, to improvements therein.

Present-day apparatus for automatically inspecting empty bottles prior to filling for cleanliness usually has an inspection station through which these bottles are passed, one at a time. If the bottles pass the inspection, they continue on the filling apparatus; otherwise, they are removed and returned for cleaning again. One type of apparatus employed at the inspection station includes a source of light which shines through the bottom of the bottle, an optical system adjacent the top of the bottle which provides for scanning the image of the bottle and directing the scanned image upon suitable photoelectric detecting equipment.

Usually, the reject mechanism associated with the inspection apparatus is actuated in response to a dirt particle giving rise to some form of modulation of the light, which falls upon the photoelectric detecting apparatus. However, bottles which have lettering on the bottom can and do give rise to a type of modulation which resembles that derived from dirt or foreign particles, with the result that false triggering of the reject apparatus occurs. This is a rather troublesome phenomena, since quite a large number of bottles do have heavily embossed lettering on the bottoms thereof.

In an attempt to improve the operation of the cleanliness-detection system, complex optical arrangements have been devised. Such systems also give rise to difficulties since, as has been found, servicing of these optical systems is required quite often for maintaining accuracy alignment, as well as cleanliness.

An object of this invention is to provide an empty bottle inspection system which does not give rise to false operation, due to the lettering on the bottoms of bottles.

Another object of this invention is the provision of an empty-bottle inspection system which is simpler than those devised heretofore.

Yet another object of this invention is the provision of an empty-bottle inspection system which has minimum service requirements.

Still another object of the present invention is the provision of an empty-bottle inspection system wherein the sensitivity is altered automatically, in accordance with the requirements established by the color of the bottle being inspected.

Yet another object of the present invention is the provision of a novel, useful, and simple empty-bottle inspection system.

The above and other objects of this invention may be achieved by providing two masks, one of which has a plurality of small, precisely located apertures, and a second of which has a single aperture large enough to cover the region included between two apertures, and rotating one of these apertures relative to the other in a manner so that the entire image of the bottle is scanned.

A photomultiplier tube is employed to receive the results of the scan. The size of each aperture in the multiaperture mask is such that the shadow cast by the lettering does not fill the aperture while the shadow cast by the smallest particle desired to be detected does fill the aperture. The circuitry associated with the photomultiplier tube operates to control the gain of the photomultiplier tube in accordance with the average light passing through the masks, and therefore automatically compensates for the variation in color and darkness of the various bottles.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 1 is a view of an inspection system in accordance with this invention;

FIGURE 2 shows a scanning disc employed in the embodiment of the invention;

FIGURE 3 shows a mask in accordance with this invention;

FIGURE 4 shows another embodiment of the invention for scanning an empty bottle for cleanliness;

FIGURE 5 shows a scanning disc employed in the embodiment of the invention as shown in FIGURE 4;

FIGURE 6 shows the mask employed in FIGURE 4 and the orientation of the image which falls upon said mask; and FIGURE 7 is a circuit diagram of the reject detecting circuitry employed with this invention.

Reference is now made to FIGURE 1, which shows the apparatus employed in accordance with this invention at an empty-bottle cleanliness-inspection station. Apparatus for carrying empty bottles through an inspection station is well known. A suitable type is shown and described in Patent No. 2,800,226. Therefore, this application will describe solely the inspection apparatus employed in the invention and not the apparatus for carrying bottles. At one side of the inspection station there is employed a suitable light source 10. The light passes through a diffuser 12, which can be opal glass or the like. This is employed to minimize inspection problems which are caused by lettering on the bottoms of bottles. However, this does not completely eliminate the problem, since many false rejects are still caused by the lettering or glass-mold marks on the bottom of bottles.

The light passes through the diffuser 12 and through the bottle 14 when it is in the inspection zone. There are various different types of well-known apparatus employed for informing the inspection electronic circuitry when a bottle is in position for inspection. For example, there may be auxiliary photoelectric apparatus for sensing this or mechanical apparatus may be employed which is actuated by the bottle being in the sensing position, to close a switch in the inspection circuit. By way of example, there is shown in FIGURE 1 a rotating turnstile 16, which engages the neck of a bottle as it comes into the inspection position. The rotating turnstile 16 is mounted on a shaft 18, which turns apparatus, such as detent apparatus, in the inspection circuit to actuate a switch, designated as the inspection-circuit trigger switch 20. When this switch opens, inspection circuitry 22 can operate in response to the output of a photomultiplier tube 24, which is positioned on the side of the bottle opposite to the side at which the light source is positioned.

The light passing through the bottle 14 is focussed by a lens 26 upon a predetermined region of a rotating scanning disc 28. The scanning disc 28 is shown in FIGURE 2 and comprises a circular opaque disc having a plurality of holes 34 therein arranged in a modified spiral pattern with variable angular spacing in a manner so that as the disc 28 is rotated, the image which the lens 26 focusses upon the disc is scanned, effectively a line at a time. Thus, a scanning action of the image is effectuated by the rotating disc, which is of the same type as occurs in the scan of an image by a television camera.

The mask 30, which is shown enlarged in FIGURE 3, has a central aperture 32, which has a diameter sufficiently large to encompass two of the adjacent apertures 34 on the scanning disc 28, plus the distance between them. Thus, the aperture 32 is made large enough to accommodate at most simultaneously two scanning apertures 34.

The light that passes through the mask 30 is directed by a lens 31 upon the photocathode of the photomultiplier tube 24. Care is taken to see that the lens 31 focusses any light passing therethrough upon the same region of the photocathode to avoid any effects which can arise should the photocathode surface not be homogeneous.

The scanning disc 28 is rotatably driven by a belt 31, which is driven by a motor 35.

After considerable investigation, it has been determined that the net effect of lettering on the bottom of a bottle is equivalent to lines which are $\frac{1}{32}''$ wide. Furthermore, it has been found that the smallest particle size desired to be detected is on the order of $\frac{1}{8}''$ diameter. In accordance with the inventive concept herein, the size of an aperture 34 in the scanning mask is made larger than the lines produced by lettering on the bottom of the bottles, but smaller than the minimum-sized object to be detected. This permits the minimum-sized object to be detected to provide a maximum of modulation of the light, whereas the modulation arising as the result of heavy bottle lettering is insufficient to trigger the reject mechanism of the bottle-inspection system.

The number of apertures 34 which are employed is determined by the size of the image field to be scanned, as well as the size of the aperture and the spacing therebetween. The apertures 34 shown on the disc 28 are disposed so that the top of the image received from the lens 26 is scanned by the aperture 34A, and the bottom of the image is scanned by the aperture 34B. The remaining apertures in between 34A and 34B are disposed so that as the disc rotates, each succeeding aperture will sweep out a succeeding line of the image so that no portion of the image is left unscanned. The dotted lines 36, shown filling the aperture 32 in FIGURE 3, illustrate the type of scanning action effectuated by the aperture 34 as the disc 28 is rotated. The reason for making the aperture 32 oversized by the diameter of a scanning aperture so that two apertures can be accommodated, is to avoid any modulation which occurs when an aperture 34 passes from the aperture 32. The light modulation which occurs as a result of going from one to two and then back to one aperture is not sufficient to trigger the reject mechanism, whereas the light modulation which occurs when a single aperture is covered completely is sufficient to trigger the reject mechanism.

FIGURE 4 shows another embodiment of the invention used in the scanning portion thereof. The photomultiplier tube 24 may be the same as is shown in FIGURE 1. A rotating housing 40 is rotatably mounted in bearings 42. Any suitable mechanism for rotating the housing 40 may be employed. This may consist, for example, of a wheel 44 having its periphery frictionally engaging the periphery of the housing 40. The wheel 44 is driven by a motor 46.

An opening in the housing 40 has positioned thereat a lens 48. The lens receives light from the bottle in the inspection-station zone. The light passes through the lens 48 and is permitted to fall on the first of a pair of prisms 50, 52. These prisms redirect the image of the bottle upon an opening in an aperture mask 54. This aperture mask, which is substantially identical with the aperture mask 30 shown in FIGURE 3, is supported at the top of the housing to be rotatable therewith. The light image passing through the aperture in the mask 54 is scanned by being passed over smaller apertures in the scanning mask 56. The scanning mask 56 is stationary. Light which passes through the scanning mask 56 is directed by a lens system 57 to fall upon substantially the same region of the photocathode to avoid false modulation due to an inhomogeneous photocathode surface.

The scanning mask 56 is shown in FIGURE 5. It has a plurality of equally spaced holes 58, which are equally distant from the center of the disc 56. The size of these holes is the same as was described in connection with the previous drawings. The aperture 55 in the mask 54 has the same dimensions as the aperture 32 in the mask shown in FIGURE 3, namely, sufficient to accommodate simultaneously two of the holes 58.

FIGURE 6 shows the appearance of the aperture mask 54 at two extremes of its path of rotation against the background of the stationary scanning disc 56, as well as the scanning pattern obtained. The aperture 55 of the disc 54 is sufficiently large to just "see" two of the apertures 58 at any one location. The effect of the prisms on the image field which passes through the aperture mask 55 is to cause it to effectively nutate or maintain the same orientation throughout its entire rotation. Thus, assuming that N and S respectively represent the top and bottom of the bottle image which is focussed by the lens 48 on the scanning disc 56, then, at the other extreme of the rotation of the mask 54, the top and bottom, respectively N and S, of the image has the same relative position as before.

As a result of the nutating motion of the image, the field of the image is scanned in a radial pattern by each one of the apertures in the scanning disc, as shown in FIGURE 6, instead of in a parallel-line pattern, as was achieved previously.

In place of the two prisms, which provide the processing motion of the image, it is possible to use a fiber optic bundle.

Reference is now made to FIGURE 7, which is a circuit diagram of the circuitry employed in the embodiment of the invention. A photomultiplier tube is employed, rather than any of the solid-state photoconductors, photovoltaic cells, or photodiodes, because the color response of a photomultiplier is more nearly that of the eye. The presently used solid-state photosensitive devices are more sensitive in one portion of the light spectrum than in the other, and, therefore, when bottles having a color which causes the light seen by the photodetecting device to be in its less sensitive region, dirt particles are not detected, and the bottles which should have been rejected are passed, or clean bottles are falsely rejected. The choice of a photomultiplier tube enables a wide range of bottles of different colors and darknesses to be inspected with an equal degree of reliability.

As is well known, a series of resistors is provided to serve as a voltage divider 60, which furnishes the voltages to the various dynodes, and the cathode of a photomultiplier tube. The terminals, which are respectively enumerated from 1 through 14, designate the pin connections to a photomultiplier tube, which, by way of example, in the embodiment of the invention which was constructed, was an RCA-type 6217. It will be seen that these terminals connect to the voltage divider 60. Terminal 14 connects to the cathode of the photomultiplier tube, and a high voltage, which is negative with respect to ground, is also connected at this point. The anode of the photomultiplier tube is at pin 11. Connection is made from pin 11 to a four-stage direct-coupled amplifier, which comprises four transistors, respectively 62, 64, 66, and 68. The output of the photomultiplier tube which is derived from pin 11 is applied to the base of transistor 62. The collector of transistor 62 is connected to the base of transistor 64. The collector of transistor 64 is connected through a diode 70 to the base of transistor 66. The collector of transistor 66 is connected through a feedback resistor 72 to the input or base of the first transistor 62. The collector of the transistor 66 is also connected to the base of transistor 68.

Output is taken from the emitter of transistor 68 and is applied to a differential amplifier comprising transistors 74 and 76, and is also applied through a low-pass filter to an amplifier 78. The low-pass filter comprises two series resistors, respectively 82 and 84, which have their junction connected to ground through a capacitor 86. A diode 88 connects the emitter of transistor 68 to the resistor 82, and the resistor 84 is connected to the base of the transistor 78. The output of transistor 78, taken from its collector, is applied to the base of a succeeding transistor 80 through a diode 90. The output of transistor 78 is also connected to resistor 92, which is the input resistor of a high-voltage regulator circuit comprising transistors 96, 98, and 100 and vacuum tubes 108 and 110. Transistors 96, 98, and 100 are connected in the manner of a three-stage direct-coupled amplifier.

The junction between resistors 92 and 94 is connected to the base of transistor 96. The collector of transistor 96 is connected through a resistor 102 to the base of transistor 98. The collector of transistor 98 is connected to a first and second load resistor 104, 106, connected in series. The junction of these two resistors is connected to the base of transistor 100.

The emitter of transistor 100 is connected to ground, and the collector of transistor 100 is connected to the cathode of a triode tube 108. The control grid of tube 108 is connected to ground. The anode of tube 108 is connected to the cathode of a second triode tube 110. The control grid of the triode tube 110 is fixedly biased by the output of a transistor power supply 112, which provides operating potential for the transistors used in the circuit.

The anode of the tube 110 is connected to one side of the high-voltage power supply. The high-voltage power supply includes a step-up transformer 114, which has a primary winding 116 connected to a source of supply 118 and a secondary winding 120. One side of the secondary winding is connected to two rectifier diodes, respectively 122, 124. Two series-connected resistors, respectively 126, 128, connect between the diode 122 and the other side of the secondary winding 120. Two series-connected resistors 130, 132 connect between the other diode 124 and the other side of the secondary winding 120. Each one of the resistors 126, 128, 132, and 130 have connected in parallel therewith the respective capacitors 132, 134, 136, and 138. The anode of tube 110 is connected to one end of the resistor 130, which is the end connected to the diode 124. The diode 122 is connected to the cathode of the photomultiplier tube which is connected to pin 14.

The high-voltage power supply circuit thus far is conventional, except for tubes 110, 108 and transistor 100, which are connected in series between one side of the high voltage power supply and ground. Since the control grid of tube 110 is connected to a fixed bias voltage and the control grid of tube 108 is connected to ground, the current which flows through this load, comprising the two tubes and the transistor, is determined by the signal applied to the base of the transistor 100. By varying this signal and thus the load current which must be supplied, the output voltage of the high-voltage supply, which is supplied to the photomultiplier tube, can be accordingly controlled.

The action of the high-voltage regulator is as follows: Positive voltage at the collector of transistor 78 is applied to the base of transistor 96 through resistor 92. If the resultant voltage at the base of transistor 96 is in excess of 10 volts (the emitter voltage on transistor 96), the collector current through transistor 96 will increase. This current increase will be amplified by transistors 98 and 100, and will produce an increase in current through vacuum tubes 108 and 110. This increased current will result in increased negative high voltage applied to the cathode of the photomultiplier and its associated voltage divider. A portion of this negative voltage will be applied via the voltage divider and resistor 94 back to the base of transistor 96. As a result of this loop, a fixed known D.C. gain exists between the voltage at the collector of transistor 78 (the input point to the high-voltage regulator loop) and the negative high voltage applied to the cathode of the photomultiplier. In an embodiment of the invention which was constructed and operated, the values chosen for the photomultiplier voltage divider and resistors 92 and 94 made this gain equal to −100.

The gain of the photomultiplier tube is therefore controlled by the signal present at the collector of transistor 78.

This signal is derived from the video signal and operates to increase the gain of the photomultiplier tube when the light levels providing the video signal are low, and to decrease the gain of the photomultiplier tube when the light level of the signal producing the video signal is high. As a result, the gain of the photomultiplier tube is automatically controlled by the amount of the light passing through bottles in the inspection station. Thus, in accordance with this invention, there is provided an arrangement for automatically varying the gains of the photomultiplier tube and therefore the inspection circuit to compensate for variations in light caused by variations in darkness and color of the bottles being inspected, and to maintain the inspection circuit accurate despite these variations.

The signal which the transistor 74 passes must exceed the bias which is applied to its emitter. This signal is established by the output derived from a potentiometer 140. The potentiometer 140 is in series with a second potentiometer 142, which is connected in series with a resistor 44. These two potentiometers and resistors are connected across the output of a transistor power supply 112. The potentiometer 140 output is connected to the emitter of transistor 74. This bias essentially determines the contrast which will be detected between the light passing through an aperture of the scanning disc and a dirt particle. The lower the bias applied to the emitter of transistor 74, the greater the modulation or contrast required to produce a signal sufficiently low to exceed this bias.

The collector of transistor 74 is connected to the base of transistor 76. The output of transistor 76 is derived from its collector, which is connected to the base of a transistor 146. The collector of transistor 80 is connected through a resistor 81 to the base of transistor 146. The collector of transistor 76 is connected through a resistor 77 to the base of transistor 146.

Transistor 76 is maintained nonconducting in the quiescent state—that is, when the contrast signal applied to transistor 74 is not sufficiently large to overcome the bias on transistor 74. The output from transistor 76 is derived from its collector, which is connected to the base of transistor 146 through resistor 77. The base of transistor 146 is also connected to the collector of transistor 80 through resistor 81. Transistor 146 is normally nonconducting, and may be driven into conduction by collector current from either transistor 76 or transistor 80. Transistor 80 is normally nonconducting; in order for transistor 80 to pass a signal, the signal must exceed the bias applied to transistor 80 from the output of potentiometer 142. The signal which is applied to the base of transistor 80 via diode 90 originates at the collector of transistor 78. This signal is also the input signal to the high-voltage regulator, and thus varies linearly with the high voltage applied to the photomultiplier tube, which is directly related to the darkness of the bottle under inspection. Thus, transistor 80 will pass a signal only when the darkness of the bottle under inspection exceeds a limit set by potentiometer 142.

The collector of transistor 146 is connected to ground through a resistor 148 and also, through a resistor 150, to the base of a transistor 152. It will be noted that the base of the transistor 152 is also connected to the collector of the transistor 154. Transistor 154 has its emitter grounded and its base connected to the voltage divider, consisting of two resistors 155, 158, in series with a diode 160, which are connected across the B+ or transistor power supply 112. Accordingly, in the quiescent state, with the polarities of the diodes shown, the transistor 154 is conducting heavily and effectively clamps the base of transistor 152 to ground. Thus, transistor 152 cannot respond to any signals applied to its base from transistor 146.

The inspection trigger switch 20, described in connection with FIGURE 1, is opened just as the bottle enters the inspection position. This switch is connected to the base of a transistor 162. This transistor is maintained nonconducting in the quiescent state, that is, when the switch 20 is closed. This is achieved by connecting the base through trigger switch 20 directly to ground.

When a bottle reaches the inspection position, then the switch 20 is opened, whereupon the base of transistor 162 is connected to B+ through resistor 164. This renders the transistor conductive, whereupon a negative-going pulse is generated at its collector. This negative-going pulse is applied through the capacitor 156 to the diode 160, which is blocked as a result of the application of this negative pulse thereto. As a result, transistor 154 is rendered nonconductive, and transistor 152 can respond to the video signal which is applied thereto from the collector of transistor 146. The time during which transistor 154 is blocked is determined by the time required to discharge capacitor 156. This is determined by the value of resistor 155, which is connected from capacitor 156 to B+.

If a video signal is generated by the photomultiplier tube as a result of the modulation caused by a dirt particle, this signal is applied to the base of transistor 152. The transistor amplifies this signal and applies it to the control electrode of a silicon-controlled rectifier 166. This enables the silicon-controlled rectifier to fire, whereby a current path is completed from the 30-volt output terminal of the transistor power supply through the solenoid winding 168 of a relay, through the normally closed contact 168A of the relay, through a resistor 170, through the silicon-controlled rectifier to ground. The silicon-controlled rectifier conduction is terminated when relay 168 is energized, and the normally closed contact 168A of the relay opens. At this time, capacitor 169 will have been discharged by the conduction of the silicon-controlled rectifier, and will charge toward 30 volts through solenoid winding 168 of the relay. The relay will remain energized for a time determined by the resistance of its winding and the value of capacitor 169.

The reject relay 168 has an additional set of normally open contacts 168B, which are closed when the relay 168 is operated. Closure of these contacts causes a solenoid 174 to be operated in response to which a reject mechanism, not shown, which rejects the bottle is operated, and, also, an indicator light 176 is illuminated.

In summary of the operation of the circuit, the photomultiplier tube has the entire operating potential applied thereto varied to control its gain in accordance with the amplitude of the illumination which it sees. In this manner, the sensitivity of the inspection system is maintained for different bottle colors automatically, without having to resort to any adjustment normally required for running different colors of bottles. Also, the photomultiplier tube has a wider spectral response than solid-state devices employed for the same purpose, and, therefore, it will not become less sensitive with a change in the color of the bottles to which it is exposed. By suitable biasing of the stages of amplification employed in this system, a limit is set on the highest gain or darkest object to which the photomultiplier will respond and, also, the degree of modulation of the light required in order for the reject mechanism to be actuated. This is effectuated by the contrast control which is employed to bias the emitter of transistor 74, whereby any modulation which is caused by obscuring less than a predetermined portion of a scanning aperture does not actuate the reject mechanism.

There has accordingly been described and shown herein a novel, useful, and reliable empty-bottle cleanliness inspection system.

We claim:

1. In an inspection system for inspecting bottles for presence of foreign particles wherein an inspection zone is provided, the improvement comprising a light source on one side of said inspection zone, a photomultiplier tube on the other side of said inspection zone, and means for scanning a bottle image interposed between said photomultiplier and said light comprising a lens, a scanning disc having a plurality of apertures therein, each of said apertures being dimensioned to be substantially obscured by the smallest foreign particle to be detected and being larger than the image produced by lettering on the bottom of a bottle, a mask having an aperture sufficiently large to encompass the distance over two successive scanning apertures, means for moving said mask and scanning disc relative to one another so that the apertures in said scanning disc alternately appear in said mask aperture as one aperture and two apertures, said lens focussing the image of said bottle on the apertures of said scanning disc, and means for rejecting a bottle responsive to an output from said photomultiplier tube generated in response to the substantial obscuring of one of said scanning apertures by foreign particles, whereby to reduce the light transmission to said photomultiplier tube toward zero.

2. Apparatus for inspecting empty bottles for cleanliness comprising a photomultiplier tube, a scanning disc having a plurality of apertures therein disposed for effectuating the successive scan of the image of a bottle, lens means for focussing the image of a bottle on the region encompassed by said scanning apertures, a mask having an aperture therein sufficiently large to encompass simultaneously two successive scanning apertures and the space therebetween, means for moving said mask and said scanning disc relative to one another to effectuate successive scanning of said bottle image by the aperture of said mask, reject mechanism driven by the output of said photomultiplier tube.

3. Empty-bottle inspection apparatus as recited in claim 2 wherein the dimensions of a scanning aperture in said scanning disc are on the order of the dimension of the smallest dirt particle to be detected and is substantially larger than the opaque region caused by a line of lettering in the bottom of a bottle.

4. Bottle-cleanliness inspection apparatus comprising an inspection zone to which a bottle to be inspected passes, a source of light on one side of said inspection zone, dirt-detecting means on the other side of said inspection zone, said dirt-detecting means including a lens, a scanning disc having a plurality of apertures therein disposed in a single-turn spiral fashion, means for rotatably mounting said disc to afford passage of the apertures therein successively through the region upon which said lens focusses the image of said bottle to effectuate scanning of said image, a mask having an aperture sufficiently large to encompass two successive apertures of said scanning disc and the space therebetween simultaneously, a photomultiplier tube having a photocathode, means for positioning said mask and said photomultiplier tube to permit light passing through the aperture of said scanning disc to fall upon the photocathode of said photomultiplier tube, and means for rejecting a bottle responsive to light passing through one of said apertures in said scanning disc being substantially interrupted by a dirt particle.

5. Empty-bottle cleanliness inspection apparatus as recited in claim 4 where the size of an aperture in said scanning disc is on the order of the size of the smallest dirt particle to be detected, but is larger than the opacity caused by a line in the lettering on the bottom of the bottle.

6. Apparatus for inspecting bottles for cleanliness comprising an inspection zone through which a bottle is passed, a source of light on one side of said zone, inspection apparatus on the other side of said zone, said inspection apparatus comprising: a photomultiplier tube having a photocathode, a scanning disc having a plurality of apertures disposed in a circle, said photomultiplier, photocathode and said scanning disc being positioned relative to one another to permit light passing through the apertures of said scanning disc to fall upon the photocathode, a rotatable housing having at one side thereof, centrally disposed to be rotatable therewith, lens means, on the other side of said housing disposed at one side thereof to be moved around the circle described by said plurality of apertures in said scanning disc a mask having an aperture therethrough sufficiently large to encompass at least two successive apertures in said scanning disc plus the distance therebetween, means interposed between said lens means and the aperture of said mask to project the image of said bottle from said light means through said mask onto the apertures in said scanning disc in a manner whereby said image will nutate as said housing is rotated, said lens means focussing said image on said scanning-disc apertures, said scanning-disc apertures being dimensioned to be substantially equal to the size of the smallest dirt particle to be detected yet larger than the opaque image produced by a line in the lettering on the base of the bottle, and a reject circuit coupled to the output of said photomultiplier means, said reject circuit including means responsive to the output from said photomultiplier when one of said scanning-disc apertures is obscured to indicate that the bottle being inspected should be rejected.

7. In an inspection system of the type where an empty bottle is passed through an inspection zone having light on one side thereof for determining whether or not any dirt particles are present in said bottle, an inspection system comprising means for establishing a light image of said bottle, means for scanning said light image, a photomultiplier tube upon which light from said means for scanning falls, means for providing operating potential for said photomultiplier tube, means for applying said operating potential to said photomultiplier tube, means for deriving an output signal from said photomultiplier tube representative of the illumination applied thereto from said means for scanning, and means for controlling said means for providing operating potential responsive to said output signal to vary the operating potential provided to maintain the output of said photomultiplier tube substantially constant despite variations in the average illumination applied to said photomultiplier tube.

8. Apparatus as recited in claim 7 wherein said means for providing operating potential comprises a transformer having a primary and a secondary winding, a first rectifier connected between one end of said secondary winding and said photomultiplier tube, a second rectifier connected to said one end of said secondary winding, a load connected between said second rectifier and the other side of said secondary winding, said load including a first and second triode tube and a transistor, said first and second triode tubes each having an anode, cathode, and control grid, the anode of said first triode tube being connected to said second rectifier, the cathode of said first triode tube being connected to the anode of second triode, means for applying a bias to the control grid of said first triode, means for applying a bias to the control grid of said second triode, said transistor having base, collector, and emitter electrodes, means connecting said collector electrode to the cathode of said second triode, means connecting said emitter electrode to a point of reference potential, and means for applying said control signal to the base of said transistor.

9. In an inspection system for inspecting bottles for the presence of foreign particles wherein an inspection zone is provided, the improvement comprising a light source on one side of said inspection zone, a photomultiplier tube on the other side of said inspection zone, means for scanning a bottle image interposed between said photomultiplier and said light comprising a lens, a scanning disc having a plurality of apertures therein, each of said apertures being dimensioned to be substantially obscured by the smallest foreign particle to be detected and being larger than the image produced by lettering on the bottom of a bottle, a mask having an aperture sufficiently large to encompass the distance over two successive scanning apertures, means for moving said mask and scanning disc relative to one another so that the apertures in said scanning disc alternately appear in said mask as one aperture and as two apertures, said lens focusing the image of said bottle on the apertures of scanning disc, means for providing operating potential for said photomultiplier tube, means for deriving a control signal from the output of said photomultiplier tube indicative of the level of illumination passing through a bottle being inspected, means for varying said means for applying operating potential to said photomultiplier tube to stabilize the output of said photomultiplier tube despite variations in the colors and light transmissivity of bottles being inspected, and means for rejecting a bottle responsive to an output from said photomultiplier tube generated in response to the substantial obscuring of one of said scanning apertures by foreign particles whereby the light transmission to said photomultiplier tube is reduced toward zero.

10. In an inspection system as recited in claim 9, wherein said means for providing operating potential comprises a transformer having a primary and a secondary winding, a first rectifier connected between one end of said secondary winding and said photomultiplier tube, a second rectifier connected to said one end of said secondary winding, a load connected between said second rectifier and the other side of said secondary winding, said load including a first and second triode tube and a transistor, said first and second triode tubes each having an anode, a cathode and control grid, the anode of said first triode tube being connected to said second rectifier, the cathode of said first triode tube being connected to the anode of said second triode tube, means for applying a bias to the control grid of said first triode tube, means for applying a bias to the control grid of said second triode, said transistor having base, collector, and emitter electrodes, means connecting said collector electrode to the cathode of said second triode, and means connecting said emitter electrode to a point of reference; and said means for varying the operating potential applied to said photomultiplier tube comprises means for applying the output from said photomultiplier tube to the base of said transistor.

11. In an inspection system for inspecting bottles for the presence of foreign particles wherein an inspection zone is provided, the improvement comprising a light source on one side of said inspection zone, a photomultiplier tube on the other side of said inspection zone, and means for scanning a bottle image interposed between said photomultiplier and said light comprising a lens, a scanning disc having a plurality of apertures therein, each of said apertures being dimensioned to be substantially obscured by the smallest foreign particle to be detected and being larger than the image produced by lettering on the bottom of the bottle, a mask having an aperture sufficiently large to encompass the distance over two successive scanning apertures, means for moving said mask and scanning disc relative to one another so that the apertures in said scanning disc alternately appear in said mask aperture as one aperture and then two apertures, said lens focusing the image of said bottle on the apertures of said scanning disc, and circuit means for rejecting a bottle responsive to the reduction in output of said photomultiplier tube when one of said scanning apertures is substantially obscured by foreign particles but not to the reduction in output of said photomultiplier tube occurring as the result of the relative mask and scanning disc motion.

12. Bottle cleanliness and inspection apparatus comprising an inspection zone to which a bottle to be inspected passes, a source of light on one side of said inspection zone, foreign particle detecting means on the other side of said inspection zone, said foreign particle detecting means including a lens, a disc having a plurality of scanning apertures therein disposed in a circle, a mask having an aperture sufficiently large to encompass two of successive apertures of said scanning disc and the space therebetween simultaneously, means for relatively rotating said disc and said mask to successively traverse said scanning apertures with said mask aperture, lens means for establishing a light image of a bottle in said inspection zone, means for nutating said light image and for directing said light image at said disc and mask, a photomultiplier tube having a photo-cathode, means for positioning said mask, said disc and said photomultiplier tube to permit light passing through the scanning apertures and through said mask aperture to fall upon said photocathode, and means for rejecting a bottle responsive to the output from said photomultiplier tube generated in response to the substantial obscuring of one of said scanning apertures by a foreign particle.

13. Apparatus for inspecting empty bottles for cleanliness comprising a photomultiplier tube, a scanning disc having a plurality of apertures therein disposed for effectuating the successive scan of the image of a bottle, lens means for focusing the image of a bottle on the region encompassed by said scanning apertures, a mask having an aperture therein sufficiently large to encompass simultaneously two successive scanning apertures and the space therebetween, means for moving said mask and said scanning disc relative to one another to effectuate successive scanning of said bottle image by the apertures of said mask, means for rejecting a bottle responsive to an output from said photomultiplier tube generated in response to the substantial obscuring of one of said scanning apertures by foreign particles, a source of operating potential, means for applying operating potential from said source to said photomultiplier tube, and means for controlling the amplitude of said operating potential responsive to the output of said photomultiplier tube to maintain said photomultiplier tube output constant despite variations in the colors and light transmissivity of bottles being inspected.

14. Apparatus for inspecting the light field derived from an object for the presence of dark regions therein exceeding a predetermined size comprising means for scanning said light field, a photomultiplier tube upon which light from said means for scanning falls, means for providing operating potential for said photomultiplier tube, means for deriving an output signal from said photomultiplier tube representative of the illumination applied thereto from said means for scanning, and means for controlling said means for providing operating potential responsive to said output signal to vary the potential provided to maintain the output of said photomultiplier tube substantially constant despite variations in the average illumination applied to said photomultiplier tube.

15. Apparatus as recited in claim 14, wherein said means for providing operating potential comprises a transformer having a primary and a secondary winding, a first rectifier connected between one end of said secondary winding and said photomultiplier tube, a second rectifier connected to one end of said secondary winding, a load connected between said second rectifier and the other side of said secondary winding, said load including a first and second triode tube and a transistor, said first and second triode tubes each having an anode, cathode, and control grid, the anode of said first triode tube being connected to said second rectifier, the cathode of said first triode tube being connected to the anode of said second triode, means for applying a bias to the control grid of said first triode, means for applying a bias to the control grid of said second triode, said transistor having base, collector and emitter electrodes, means connecting said collector electrode to the cathode of said second triode, means connecting said emitter electrode to a point of reference potential, and means for applying said control signal to the base of said transistor.

16. Apparatus for inspecting a light field derived from an object for the presence of predetermined dark spots within said light field comprising a photomultiplier tube for receiving light from said light field, means for deriving an output signal from said photomultiplier tube responsive to the illumination received from said light field, means for obtaining an average value of said output signal, first reference bias means, means for comparing said average value with said first reference bias means to derive a control signal, means for supplying operating potential to said photomultiplier tube, and means for varying said means for supplying operating potential responsive to said control signal to maintain the output of said photomultiplier tube substantially constant despite variations in the average value of said output signal.

17. Apparatus for inspecting a light field derived from an object for the presence of predetermined dark spots within said light field comprising a photomultiplier tube for receiving light from said light field, means for deriving an output signal from said photomultiplier tube responsive to the illumination received from said light field, means for obtaining an average value of said output signal, first reference bias means, means for comparing said average value with said first reference bias means to derive a first control signal, means for supplying operating potential to said photomultiplier tube, means for varying said means for supplying operating potential responsive to said first control signal to maintain the output of said photomultiplier tube substantially constant despite variations in the average value of said output signal, a second reference bias, means for comparing said output signal with said second reference bias to derive a second control signal, and means responsive to the condition of one of said first control signal exceeding a predetermined value and said second control signal being present to provide an output indication thereof.

18. Apparatus for inspecting a light field derived from an object for the presence of predetermined dark spots within said light field comprising a photomultiplier tube for receiving light from said light field, means for deriving an output signal from said photomultiplier tube responsive to the illumination received from said light field, means for obtaining an average value of said output signal, first reference bias means, means for comparing said average value with said first reference bias means to derive a first control signal, means for supplying operating potential to said photomultiplier tube, means for varying said means for supplying operating potential responsive to said first control signal to maintain the output of said photomultiplier tube substantially constant despite variations in the average value of said output signal, a second reference bias, means for comparing said output signal with said second reference bias to derive a second control signal, and circuit means responsive to the condition of one of said first control signal exceeding a predetermined value and said second control signal being present to provide a reject signal output.

References Cited by the Examiner
UNITED STATES PATENTS

| | | | |
|---|---|---|---|
| 2,265,037 | 12/1941 | Gulliksen. | |
| 2,534,668 | 12/1950 | Gunderson | 250—207 |
| 2,583,143 | 1/1952 | Glick | 250—207 |
| 2,636,602 | 4/1953 | Stoate | 209—111.7 |
| 2,707,238 | 4/1955 | Fromm | 250—207 |
| 2,750,519 | 6/1956 | Summerhayes | 250—214 |
| 2,798,605 | 7/1957 | Richards | 209—111.5 |
| 2,840,720 | 6/1958 | Van Rennes | 250—207 |
| 3,115,970 | 12/1963 | Husome | 209—111.7 |
| 3,133,640 | 5/1964 | Calhoun | 209—111.7 |
| 3,170,032 | 2/1965 | Evans et al. | 250—207 X |

References Cited by the Applicant
UNITED STATES PATENTS

| | | |
|---|---|---|
| 2,605,430 | 7/1952 | Marcy. |
| 2,841,718 | 7/1958 | Hoover. |
| 2,966,264 | 12/1960 | Cox. |
| 3,098,565 | 7/1963 | Fouse et al. |

M. HENSON WOOD, JR., *Primary Examiner.*

FRANK L. ABBOTT, ROBERT B. REEVES, *Examiners.*